(12) United States Patent
Lee et al.

(10) Patent No.: US 11,378,164 B2
(45) Date of Patent: Jul. 5, 2022

(54) DUAL TENSIONER AND ENGINE PROVIDED WITH THE SAME

(71) Applicants: HYUNDAI MOTOR COMPANY, Seoul (KR); KIA MOTORS CORPORATION, Seoul (KR)

(72) Inventors: Jae Kyu Lee, Hwaseong-Si (KR); Tae Hoon Roh, Seoul (KR); Heedo Kwon, Gunpo-Si (KR); Jong Won Lee, Hwaseong-Si (KR); Jaekyun Lee, Hwaseong-Si (KR); In Jae Seo, Seoul (KR); Hyun Jeong Baek, Busan (KR); Kye Oong Song, Yongin-Si (KR); Woong Na, Hwaseong-Si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 793 days.

(21) Appl. No.: 16/190,445

(22) Filed: Nov. 14, 2018

(65) Prior Publication Data
US 2019/0186601 A1 Jun. 20, 2019

(30) Foreign Application Priority Data

Dec. 18, 2017 (KR) ........................ 10-2017-0174546

(51) Int. Cl.
*F16H 7/12* (2006.01)
*F02B 67/06* (2006.01)
(Continued)

(52) U.S. Cl.
CPC ........... *F16H 7/1281* (2013.01); *F02B 67/06* (2013.01); *F02N 11/003* (2013.01); *F16H 7/02* (2013.01);
(Continued)

(58) Field of Classification Search
CPC .......... F16H 7/1281; F16H 2007/0806; F16H 2007/0874; F16H 2007/0893; F16H 7/08
(Continued)

(56) References Cited

U.S. PATENT DOCUMENTS 7,468,013 B2 * 12/2008 Di Giacomo ........... F02B 67/06
474/134
8,968,128 B2 * 3/2015 Wolf ..................... F16H 7/1281
474/135
(Continued)

FOREIGN PATENT DOCUMENTS

DE 10 2011 053 869 A1 3/2013
DE 10 2014 207 720 A1 11/2014
(Continued)

OTHER PUBLICATIONS

Office Action issued in corresponding German Patent Application No. 102018219566.8 dated Apr. 21, 2021, with English translation.
(Continued)

*Primary Examiner* — Henry Y Liu
(74) *Attorney, Agent, or Firm* — Morgan, Lewis & Bockius LLP

(57) ABSTRACT

An engine includes: a crankshaft pulley; a motor/generator mounted to a side of the engine and including a motor pulley; an auxiliary driving device pulley; a dual tensioner including a tensioner arm of which a first idler pulley is mounted to a first end of the tension arm and a second idler pulley is mounted to a second end of the tension arm, and the tensioner arm rotatable around a center of the motor/generator and a belt connecting the crankshaft pulley, the motor pulley, the auxiliary driving device pulley, the first idler pulley, and second idler pulley.

12 Claims, 6 Drawing Sheets

(51) Int. Cl.
  *F16H 7/02* (2006.01)
  *F02N 11/00* (2006.01)
  *F16H 7/08* (2006.01)
(52) U.S. Cl.
  CPC ............... *F16H 2007/0806* (2013.01); *F16H 2007/0865* (2013.01); *F16H 2007/0874* (2013.01); *F16H 2007/0893* (2013.01)
(58) Field of Classification Search
  USPC ......................................................... 474/134
  See application file for complete search history.

(56) References Cited

U.S. PATENT DOCUMENTS

| | | | | |
|---|---|---|---|---|
| 9,097,314 | B2* | 8/2015 | Wolf | F16H 7/1281 |
| 9,103,411 | B2* | 8/2015 | Wolf | F16H 7/1281 |
| 9,182,015 | B2* | 11/2015 | Mack | F16H 7/1281 |
| 9,416,853 | B2* | 8/2016 | Wolf | F16H 7/1281 |
| 10,641,364 | B2* | 5/2020 | Reuschel | F16H 7/0838 |
| 10,704,656 | B2* | 7/2020 | Maricic | F16H 7/0831 |
| 10,788,105 | B2* | 9/2020 | Reuschel | F16H 7/1218 |
| 10,788,106 | B2* | 9/2020 | Hauck | F16H 7/1281 |
| 11,131,366 | B2* | 9/2021 | Maricic | F16H 7/08 |
| 2003/0109342 | A1* | 6/2003 | Oliver | F02B 67/06 |
| | | | | 474/134 |
| 2013/0040770 | A1* | 2/2013 | Wolf | F16H 7/1281 |
| | | | | 474/134 |
| 2013/0095967 | A1* | 4/2013 | Wolf | F16H 7/1281 |
| | | | | 474/135 |
| 2013/0203535 | A1* | 8/2013 | Mack | F16H 7/129 |
| | | | | 474/134 |
| 2014/0256488 | A1* | 9/2014 | Wolf | F16H 7/1281 |
| | | | | 474/135 |
| 2015/0369347 | A1* | 12/2015 | Wolf | F16H 7/1281 |
| | | | | 474/134 |
| 2016/0054685 | A1* | 2/2016 | Hazeki | G03G 15/1615 |
| | | | | 474/134 |
| 2016/0363197 | A1* | 12/2016 | Wolf | F16H 7/1281 |
| 2017/0307051 | A1* | 10/2017 | Petridis | G01L 5/04 |
| 2018/0202521 | A1* | 7/2018 | Reuschel | F02B 67/06 |
| 2018/0320765 | A1* | 11/2018 | Hauck | F16H 7/1281 |
| 2019/0145501 | A1* | 5/2019 | Singh | F16H 7/08 |
| | | | | 474/134 |
| 2019/0203811 | A1* | 7/2019 | Maricic | F16H 7/08 |

FOREIGN PATENT DOCUMENTS

| | | |
|---|---|---|
| EP | 2 573 423 A1 | 3/2013 |
| JP | 2004-068973 A | 3/2004 |
| JP | 2015-194182 A | 11/2015 |
| WO | 2016/123723 A1 | 8/2016 |

OTHER PUBLICATIONS

Office Action issued in corresponding Korean Patent Application No. 10-2017-0174546 dated Mar. 15, 2022, with English translation.

\* cited by examiner

DUAL TENSIONER AND ENGINE PROVIDED WITH THE SAME

CROSS-REFERENCE TO RELATED APPLICATION

This application claims priority to and the benefit of Korean Patent Application No. 10-2017-0174546 filed in the Korean Intellectual Property Office on Dec. 18, 2017, the entire contents of which are incorporated herein by reference.

TECHNICAL FIELD

The present disclosure relates to a dual tensioner and an engine provided with the same. More particularly, the present disclosure relates to a dual tensioner capable of dispersing tension applied to a belt and an engine provided with the same.

BACKGROUND

A general tensioner which is a device that prevents a timing chain or belt from loosening absorbs changes in tension to prevent deterioration of chain or belt noise and enhance durability.

In a general vehicle, two mechanical tensioners are located at the front and rear of an alternator, which may adversely affect engine layout, cost, and weight.

Since two tensioners are mounted between an engine block and the alternator, the alternator needs to be moved to the outside of the engine so that a layout of the entire engine is limited.

In addition, when a tensioner in an alternator rotating direction is operated, tension of the belt continuously significantly increases as each tensioner moves independently. That is, a local tension change of the belt is increased.

The above information disclosed in this Background section is only for enhancement of understanding of the background of the disclosure, and therefore, it may contain information that does not form the prior art that is already known in this country to a person of ordinary skill in the art.

SUMMARY

The present disclosure has been made in an effort to provide dual tensioner capable of dispersing tension applied to a belt and an engine provided with the same.

An engine according to an exemplary embodiment of the present disclosure may include: a crankshaft pulley; a motor/generator mounted to a side of the engine and including a motor pulley; an auxiliary driving device pulley; a dual tensioner including a tensioner arm of which a first idler pulley is mounted to a first end of the tension arm and a second idler pulley is mounted to a second end of the tension arm, and the tensioner arm rotatable around a center of the motor/generator; and a belt connecting the crankshaft pulley, the motor pulley, the auxiliary driving device pulley, the first idler pulley, and second idler pulley.

The belt may wind around the crankshaft pulley, the first idler pulley, the motor pulley, the second idler pulley, the auxiliary driving device pulley and the crankshaft pulley in order along rotating direction of the belt.

A rotation center of the tensioner arm may be co-incident with a rotation center of the motor pulley.

The tensioner arm may be formed along a circumference from a rotation center of the motor pulley.

The dual tensioner may further include a tensioner housing connected with the motor/generator, a bearing disposed within the tensioner housing and supporting a rotation of the tensioner arm and a tension spring supplying elastic force along a circumferential direction of the tensioner arm.

The motor/generator may be a mild hybrid starter generator.

The first idler pulley and the second idler pulley may be rotated along a rotating direction of the motor/generator when the engine starts.

The first idler pulley and the second idler pulley may be rotated to opposite direction of a rotation direction of the crankshaft pulley during electricity generation of the motor/generator by a rotation of the engine.

The first idler pulley and the second idler pulley may be rotated along a rotating direction of the motor/generator in boosting of the motor/generator.

The auxiliary driving device pulley may be any one selected from a group including a pulley for a compressor of an air-conditioner, a pulley for an oil pump or a pulley for a coolant pump.

A dual tensioner according to another exemplary embodiment of the present disclosure may include: a tensioner arm of which a first idler pulley is mounted to a first end of the tension arm and a second idler pulley is mounted to a second end of the tension arm; a tensioner housing connected with the motor/generator; a bearing disposed within the tensioner housing and supporting rotation of the tensioner arm; and a tension spring supplying elastic force in a circumferential direction of the tensioner arm.

The tensioner arm may be formed along a circumference from a rotation center of the motor pulley.

According to the exemplary embodiment of the present disclosure, the dual tensioner and the engine provided with the same may disperse tension applied to a belt and an engine provided with the same.

Since the dual tensioner and the engine provided with the same may disperse tension applied to a belt, noise and vibration of the belt may be reduced.

Since two tensioners mounted between an engine block and the alternator may be replaced by the dual tensioner according to the exemplary embodiment of the present disclosure, design and layout of an engine may be simplified and manufacturing cost may be reduced.

According to the exemplary embodiment of the present disclosure, the dual tensioner and the engine provided with the same may not require a space for mounting a dual tensioner between an engine block and a motor/generator so that adjustment of a position of the motor/generator may be easily performed.

DETAILED DESCRIPTION OF THE EMBODIMENTS

Figure 1:
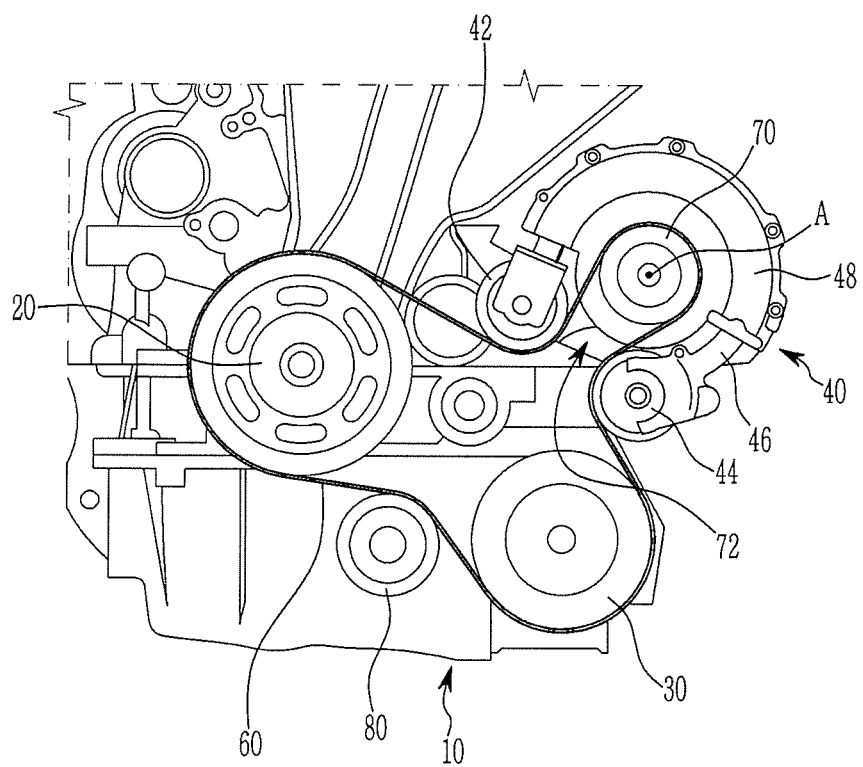
FIG. 1 is a front view of an engine provided with a dual tensioner according to an exemplary embodiment of the present disclosure.

In the following detailed description, only certain exemplary embodiments of the present disclosure have been shown and described, simply by way of illustration.

As those skilled in the art would realize, the described embodiments may be modified in various different ways, all without departing from the spirit or scope of the present disclosure Through the specification, like reference numerals designate like elements throughout the specification.

In the drawings, the thickness of layers, films, panels, regions, etc., are exaggerated for clarity.

When it is described that a certain part such as a layer, a region, a substrate, etc., is located "above" another part, it means that the certain part may be located "directly above" on the other part and a third part may be interposed therebetween as well.

In contrast, when an element is referred to as being "directly on" another element, there are no intervening elements present.

Throughout the specification, unless explicitly described to the contrary, the word "comprise" and variations such as "comprises" or "comprising", will be understood to imply the inclusion of stated elements but not the exclusion of any other elements.

An exemplary embodiment of the present disclosure will hereinafter be described in detail with reference to the accompanying drawings.

Figure 2:
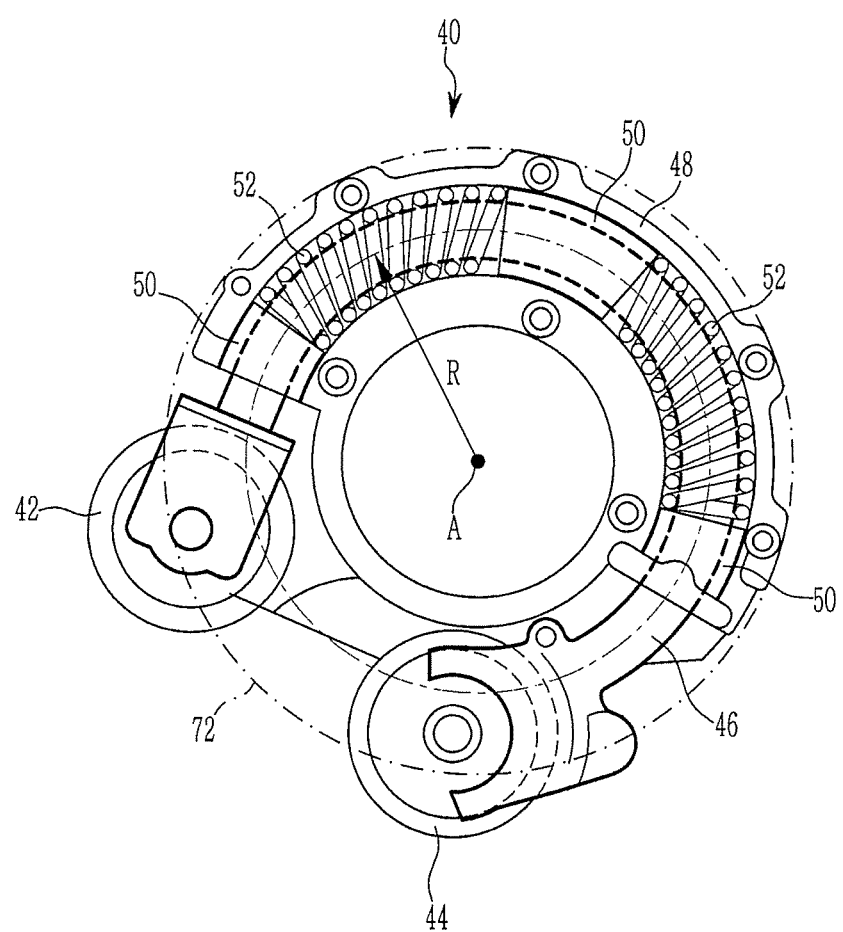
FIG. 2 is a drawing showing a dual tensioner according to an exemplary embodiment of the present disclosure.

FIG. 1 is a front view of an engine provided with a dual tensioner according to an exemplary embodiment of the present disclosure, and FIG. 2 is a drawing showing a dual tensioner according to an exemplary embodiment of the present disclosure.

An engine 10 according to an exemplary embodiment of the present disclosure may include a crankshaft pulley 20, a motor/generator 72 mounted to a side of the engine 10 and including a motor pulley 70, an auxiliary driving device pulley 30, a dual tensioner 46 including a tensioner arm 46 of which a first idler pulley 42 is mounted to a first end thereof and a second idler pulley 44 is mounted to a second end thereof and the tensioner arm 46 rotatable around a center of the motor/generator 72 and a belt 60 connecting the crankshaft pulley 20, the motor pulley 70, the auxiliary driving device pulley 30 and the first idler pulley 42 and second idler pulley 44.

The belt 60 winds around the crankshaft pulley 20, the first idler pulley 42, the motor pulley 70, the second idler pulley 44, the auxiliary driving device pulley 30 and the crankshaft pulley 20 in order along rotating direction of the belt 60.

Further, a center idler pulley 80 may be disposed between the auxiliary driving device pulley 30 and the crankshaft pulley 20 for preventing the belt 60 from slipping between the auxiliary driving device pulley 30 and the crankshaft pulley 20.

A rotation center of the tensioner arm 46 may be co-incident with a rotation center A of the motor pulley 70, and may be formed along a circumference from a rotation center A of the motor pulley 70. That is, the tensioner arm 46 may be formed with a radius R from the rotation center A of the motor pulley 70.

The dual tensioner 40 may further include a tensioner housing 48 connected with the motor/generator 72, a bearing 50 disposed within the tensioner housing 48 and supporting a rotation of the tensioner arm 46 and a tension spring 52 supplying elastic force along a circumferential direction of the tensioner arm 46.

The tension spring 52 supplies elastic force to the tensioner arm 46 when the tensioner arm 46 rotates due to force induced by the belt 60.

The bearing 50 is disposed within the tensioner housing 48 configured for the tensioner arm 46 to rotate around the rotation center A of the motor pulley 70.

The motor/generator 72 may be a mild hybrid starter generator (MHSG).

The auxiliary driving device pulley 30 may be any one selected from a group including a pulley for a compressor of an air-conditioner, a pulley for an oil pump and a pulley for a coolant pump.

In a general vehicle, two mechanical tensioners are located at the front and rear of an alternator, which may adversely affect engine layout, cost, and weight.

One dual tensioner according to an exemplary embodiment of the present disclosure may be applied to an engine, so that design and layout of an engine may be simplified and manufacturing cost may be reduced.

In the present disclosure, the first idler pulley 42 and the second idler pulley 44 may be connected through the tensioner arm 46, and the tensioner arm 46 may rotate around the motor/generator 72. Even though tension is applied to any one of the idler pulleys, the other idler pulley also rotate around the motor/generator 72 so as to compensate change of belt length. That is, the dual tensioner according to an exemplary embodiment of the present disclosure may minimize effect of tension changes in a section of the belt 60.

FIG. 3 to FIG. 6 are drawings showing operations of a dual tensioner according to an exemplary embodiment of the present disclosure.

In FIG. 1 to FIG. 6, it is assumed that the crankshaft pulley 20 and the motor pulley 70 rotate in a clockwise direction.

Figure 3:
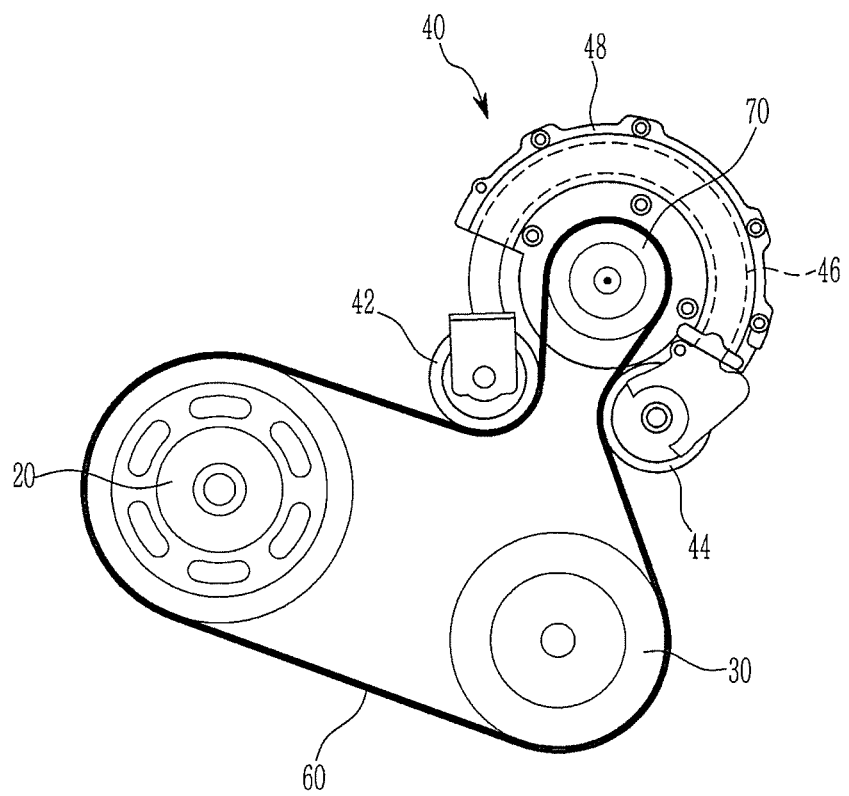
FIG. 3 to FIG. 6 are drawings showing operations of a dual tensioner according to an exemplary embodiment of the present disclosure.

FIG. 3 is a drawing showing an idle state of the dual tensioner according to an exemplary embodiment of the present disclosure.

Referring to FIG. 3, in the idle state, the first idler pulley 42 and the second idler pulley 44 remain at rest with balance external force.

Figure 4:
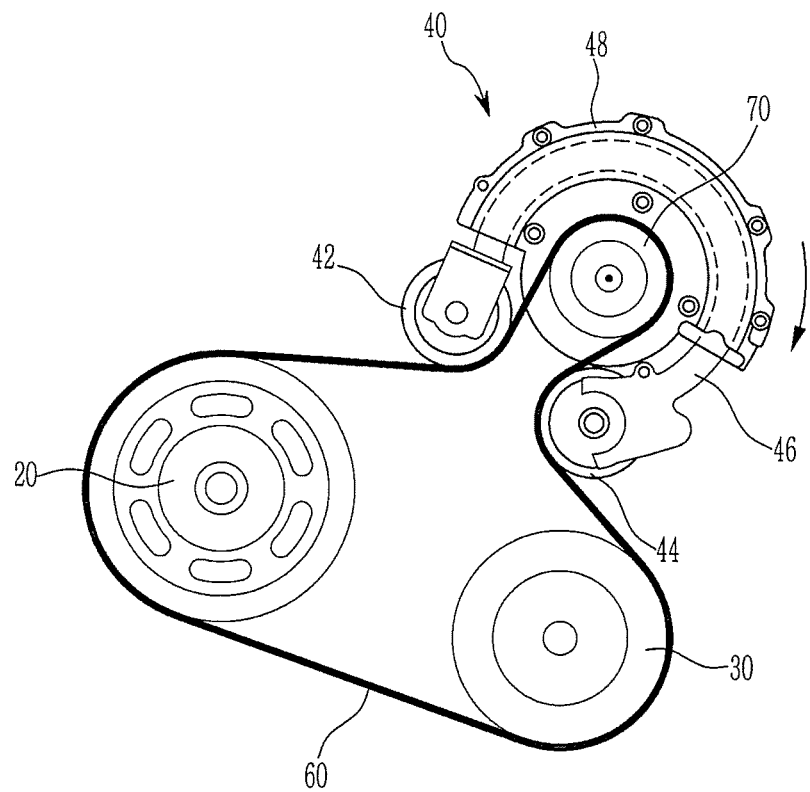

FIG. 4 is a drawing showing a starting state of the dual tensioner according to an exemplary embodiment of the present disclosure.

Referring to FIG. 4, the first idler pulley 42 and the second idler pulley 44 rotate along a rotating direction of the motor/generator when the engine 10 starts.

That is, when the motor/generator 72 rotates the engine 10, local or partial tension of the belt 60 between the crankshaft pulley 20 and the motor pulley 70 is increased. Thus, the first idler pulley 42 turns clockwise around the center of the motor/generator 72, and also, the second idler pulley 44 connected with the first idler pulley 42 turns clockwise around the center of the motor/generator 72.

Then, the second idler pulley 44 pushes the belt 60 between the motor pulley 70 and the auxiliary driving device pulley 30 to increase tension between thereof.

That is, the dual tensioner according to exemplary embodiment of the present disclosure and the engine provided with the same may disperse tension applied to the belt 60 and minimize local or partial differences of tension of the belt 60 in the starting state.

Figure 5:
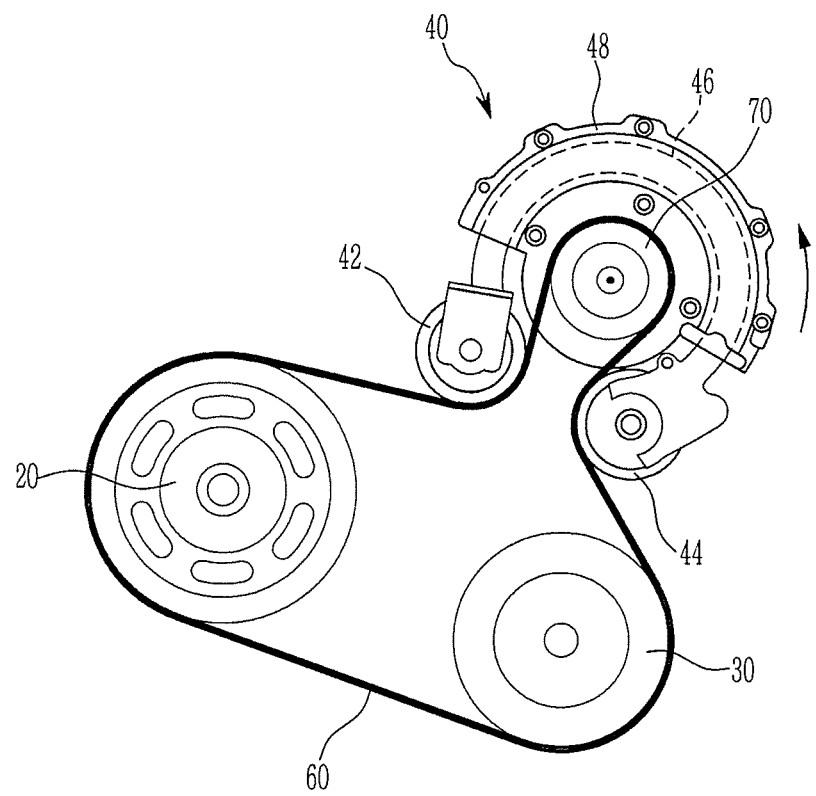

FIG. 5 is a drawing showing an electricity generation state of the dual tensioner according to an exemplary embodiment of the present disclosure.

Referring to FIG. 5, in the electricity generation state, the crankshaft pulley 20 rotates the motor pulley 70, and thus, the first idler pulley 42 and the second idler pulley 44 turn anticlockwise, That is, when the motor/generator 72 is rotated by operation of the engine 10, local or partial tension of the belt 60 between the motor pulley 70 and the auxiliary driving device pulley 30 is increased. Thus, the second idler pulley 44 turns anticlockwise around the center of the motor/generator 72 and the first idler pulley 42 connected with the second idler pulley 44 also turns anticlockwise around the center of the motor/generator 72.

Then, the first idler pulley 42 pushes the belt 60 between the crankshaft pulley 20 and the motor pulley 70 to increase tension between thereof.

Therefore, the dual tensioner according to exemplary embodiment of the present disclosure and the engine provided with the same may disperse tension applied to the belt 60 and minimize local or partial differences of tension of the belt 60 in the electricity generation state.

Figure 6:
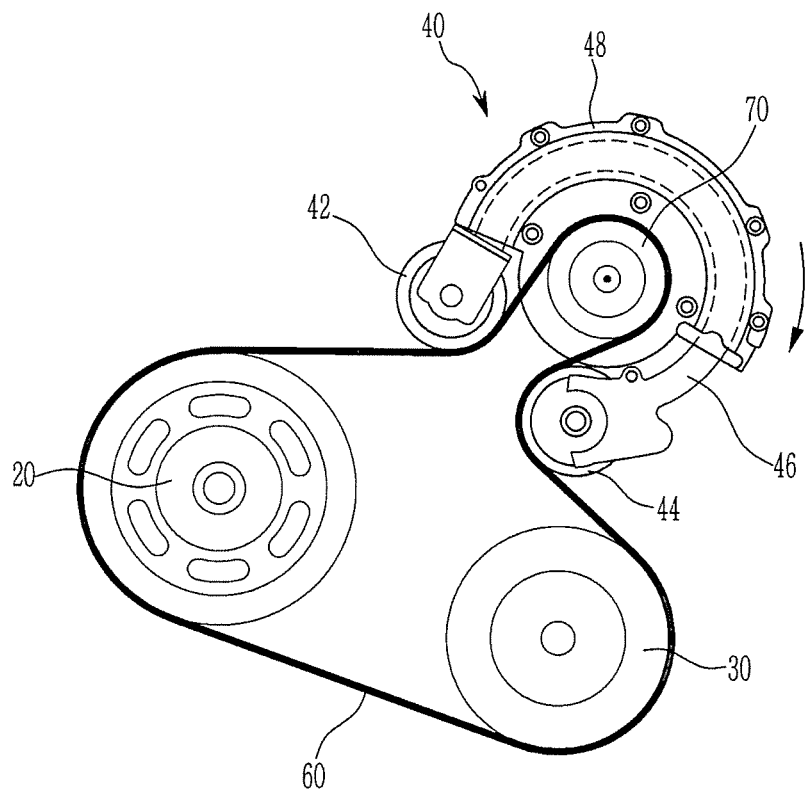

FIG. 6 is a drawing showing a boosting state of the dual tensioner according to an exemplary embodiment of the present disclosure.

Referring to FIG. 6, the first idler pulley 42 and the second idler pulley 44 are rotated along a rotating direction of the motor/generator when the motor/generator 72 boosts.

That is, when the motor/generator 72 transmits a turning force to the engine 10, local or partial tension of the belt 60 between the crankshaft pulley 20 and the motor pulley 70 increases. Thus, the first idler pulley 42 turns clockwise around the center of the motor/generator 72, and also, the second idler pulley 44 connected with the first idler pulley 42 turns clockwise around the center of the motor/generator 72.

Then, the second idler pulley 44 pushes the belt 60 between the motor pulley 70 and the auxiliary driving device pulley 30 to increase tension between thereof.

Therefore, the dual tensioner according to exemplary embodiment of the present disclosure and the engine provided with the same may disperse tension applied to the belt 60 and minimize local or partial differences of tension of the belt 60 in the boosting state.

As described above, the dual tensioner according to exemplary embodiment of the present disclosure and the engine provided with the same may disperse tension applied to the belt, so that noise and vibration of the belt may be reduced.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. An engine comprising:
 a crankshaft pulley;
 a motor/generator mounted to a side of the engine, the motor/generator including a motor pulley;
 an auxiliary driving device pulley;
 a dual tensioner including a tensioner arm, wherein the tensioner arm has a first idler pulley mounted to a first end of the tension arm and a second idler pulley mounted to a second end of the tension arm, and the tensioner arm is rotatable around a center of the motor/generator; and
 a belt connecting the crankshaft pulley, the motor pulley, the auxiliary driving device pulley, the first idler pulley, and second idler pulley.

2. The engine of claim 1, wherein the belt winds around the crankshaft pulley, the first idler pulley, the motor pulley, the second idler pulley, the auxiliary driving device pulley, and the crankshaft pulley sequentially in a rotating direction of the belt.

3. The engine of claim 1, wherein a rotation center of the tensioner arm coincides with a rotation center of the motor pulley.

4. The engine of claim 1, wherein the tensioner arm is disposed along a circumference of the dual tensioner around a rotation center of the motor pulley.

5. The engine of claim 1, wherein the dual tensioner further comprises:
 a tensioner housing connected with the motor/generator;
 a bearing disposed within the tensioner housing and supporting rotation of the tensioner arm; and
 a tension spring supplying elastic force along a circumferential direction of the tensioner arm.

6. The engine of claim 5, wherein the motor/generator is a mild hybrid starter generator.

7. The engine of claim 6, wherein the first idler pulley and the second idler pulley are rotated along a rotating direction of the motor/generator when the engine starts.

8. The engine of claim 5, wherein the first idler pulley and the second idler pulley rotate in an opposite direction of a rotation direction of the crankshaft pulley during electricity generation of the motor/generator by rotation of the engine.

9. The engine of claim 5, wherein the first idler pulley and the second idler pulley rotate along a rotating direction of the motor/generator in boosting of the motor/generator.

10. The engine of claim 1, wherein the auxiliary driving device pulley is any one selected from the group consisting of a pulley for a compressor of an air-conditioner, a pulley for an oil pump, and a pulley for a coolant pump.

11. A dual tensioner comprising:
 a tensioner arm having a first idler pulley mounted to a first end of the tensioner arm and a second idler pulley mounted to a second end of the tensioner arm;
 a tensioner housing connected with the motor/generator;
 a bearing disposed within the tensioner housing and supporting rotation of the tensioner arm; and
 a tension spring supplying elastic force in a circumferential direction of the tensioner arm.

12. The dual tensioner of claim 11, wherein the tensioner arm is disposed along a circumference of the dual tensioner around a rotation center of the motor pulley.

* * * * *